May 12, 1936.  I. J. GALLAGHER  2,040,734
VISUAL INDICATOR FOR AIRCRAFT RADIO BEACON SYSTEMS
Filed April 5, 1933
Fig. 1.
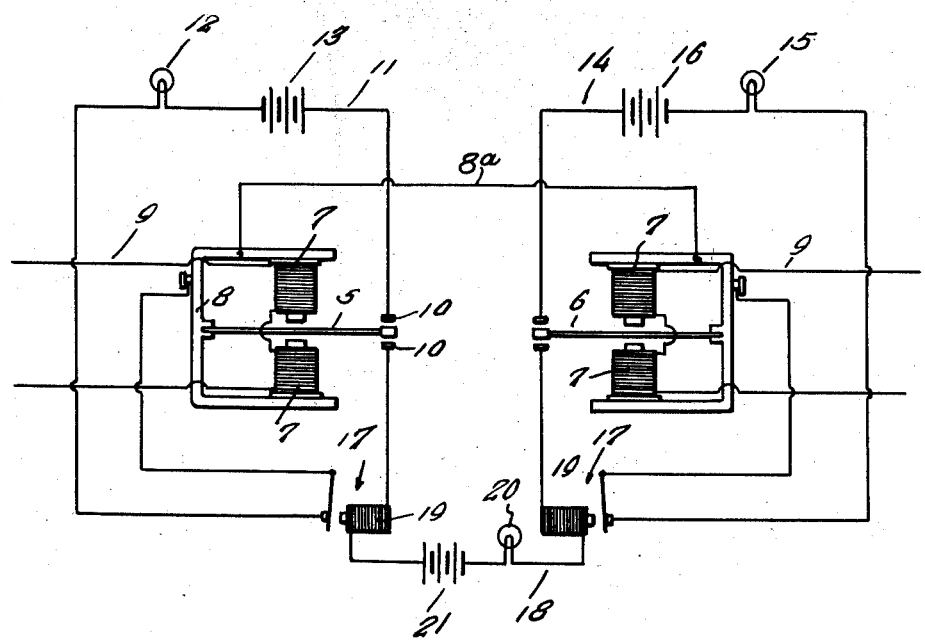
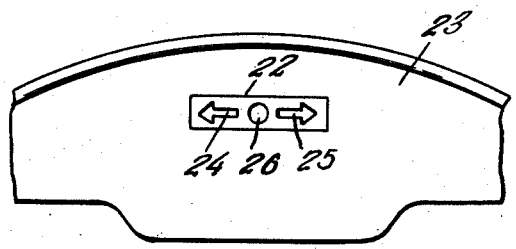
Fig. 2.
Inventor
Irving J. Gallagher
By Clarence A. O'Brien
Attorney Patented May 12, 1936

2,040,734

UNITED STATES PATENT OFFICE 2,040,734

VISUAL INDICATOR FOR AIRCRAFT RADIO BEACON SYSTEMS

Irving J. Gallagher, Elizabeth, N. J.

Application April 5, 1933, Serial No. 664,658

1 Claim. (Cl. 177—352)

This invention appertains to new and useful improvements in tuned reed indicators for use in connection with radio beacon systems; the present invention aiming to increase the efficiency of the present types of reed indicators by adding visual means in the form of signal lamps which are controlled by the action of the reeds of the conventional reed indicator.

The conventional tuned reed indicator is a simple and reliable instrument for use in connection with the radio beacon system for guiding aircraft. This beacon system was developed with a view to giving a pilot an indication as to whether or not he is flying on a specified course, and if not, to which side and how much he has deviated. This indication is given by two vibrating reeds, the relative amplitudes of vibration of which indicate the position of the aircraft with respect to the beacon course. Equal amplitude of the two reeds indicates that the airplane is on the course. The reeds give a continuous indication to the pilot of his position with respect to his course. This indication is obtained without much difficulty by the pilot, but when flying through fog, the pilot is bound to carefully watch the reeds and this results in considerable eye strain.

It is, therefore, an important object of the present invention to provide a visual indicator in the form of a directional signal outfit which will give the direction of flight in a clear and well defined manner, and which will eliminate the necessity of the pilot keeping his eyes fixed on the instrument for any tiring length of time.

Another important object of the invention is to provide a course indicator of the type above specified which employs an "on course" signal and "off course" signal, wherein the "off course" signal will become deenergized and the "on course" signal singly energized when the aircraft is directly on its course.

These and various other important objects and advantages of the invention will become apparent to the reader of the following specification.

In the drawing:—

Figure 1 represents a diagrammatic view of the invention, the same showing the electrical elements employed and the connections between the same.

Figure 2 represents a fragmentary front elevational view of the instrument board of an aircraft, showing the direction signal box installed thereon.

Referring to the drawing wherein like numerals designate like parts, it can be seen that numerals 5—6 represent the tuned reeds, each operated by a pair of electromagnets 7—7 on a permanent horseshoe magnet 8. These magnets 8 are bridged by the jumper 8a.

Arbitrarily, the reed 5 is tuned for approximately 65 cycle vibrations, while the reed 6 is tuned for approximately 86.7 cycle vibrations. As in conventional hook-ups, the output 9 of the beacon receiver is connected to the coils 7—7 in the manner substantially shown in Figure 1.

In carrying out the present invention, a contact 10 is placed on each side of each of the reeds 5—6. Numeral 11 represents the left "off course" light circuit which includes the signal lamp 12 and its source of current 13, while numeral 14 represents the right "off course" signal circuit which includes the signal lamp 15 and source of current 16.

Each of these circuits 11 and 14 has a magnetically operated switch generally referred to by numeral 17 installed therein and as is clearly shown in Figure 1, a pair of contacts 10—10 is located in this circuit. A connection 18 is provided between the coils 19 of the electro-magnetic switches 17 and in this connection is the "on course" signal lamp 20 and its source of current 21.

In operation, assume that the aircraft is off its course on the left of the beacon. The reed 5 will vibrate and in engaging the contacts 10, will close the circuit 11 to the end that the lamp 12 will be energized and will indicate to the pilot that he is off the course on the left. While the lamp 12 is energized, the lamp 15 is, of course, de-energized because of the inactivity of the reed 6. The same operation takes place when the aircraft is on the right of the beacon, in which case the circuit 14 is energized for lighting the lamp 15.

When the aircraft returns to the course, both of the reeds will operate simultaneously, which will result in the energization of the electro-magnets 19, opening the switches, thus breaking the lamp circuits 11 and 14 and adopting part of these circuits to form a circuit for the "on course" lamp 20 which will now be energized.

It is preferable that the lamps 12 and 15 as well as the lamp 20 be installed in a lamp box 22 situated on the usual instrument board 23 of the aircraft and it is furthermore desirable that the front face of this lamp box be struck out with arrows 24—25 pointing in opposite directions and a central opening 26 through which light from the bulb 20 can shine. The interior of this lamp box will be divided by two partitions into three separate lamp compartments to accommodate the three lamps hereinbefore specified.

Thus it can be seen that the reeds are entirely invisible to the pilot and that the pilot will depend upon the clearer and more well defined form of indication offered by the lamps.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a radio aircraft beacon indicator, a pair of vibratory armature relays having normally separated contacts, and tuned to different frequencies of vibration, a second pair of relays, having contacts in normally closed circuit position, a circuit to be controlled by each of the vibratory relays including a signal, a source of current, contacts of the corresponding vibratory relay and contacts of a second relay, a third circuit including a signal, a source of current, the magnets of the second relays and contacts of the vibratory relays in series.

IRVING J. GALLAGHER.